United States Patent

Erbert

[15] 3,663,758

[45] May 16, 1972

[54] SPEECH PATTERN RECOGNITION SYSTEM

[72] Inventor: Virgil Erbert, Albuquerque, N. Mex.

[73] Assignee: Teaching Complements, Incorporated

[22] Filed: Mar. 24, 1970

[21] Appl. No.: 22,155

[52] U.S. Cl. ....................................................179/1 SA

[51] Int. Cl. ....................................................G10l 1/00

[58] Field of Search ................179/1 SA, 1 SB, 1 VS; 324/96, 324/80; 350/153, 159; 250/225, 232

[56] References Cited

UNITED STATES PATENTS

| | | | |
|---|---|---|---|
| 3,286,032 | 11/1966 | Baum | 179/1 SA |
| 2,803,800 | 8/1957 | Vilbig | 324/80 |
| 2,903,598 | 9/1959 | Hoover | 350/153 |
| 2,629,778 | 2/1953 | Potter | 179/1 VS |
| 2,840,441 | 6/1958 | Owen | 350/159 |
| 2,640,880 | 6/1953 | Aigrain | 179/1 SA |
| 3,213,197 | 10/1965 | Hawkins | 179/1 SA |

*Primary Examiner*—Kathleen H. Claffy
*Assistant Examiner*—Jon Bradford Leaheey
*Attorney*—Richards, Harris & Hubbard

[57] ABSTRACT

A speech pattern recognition system includes sets of radiation modulation members that transmit radiation of two different types and two radiation responsive members each for receiving one of the radiation types. A shutter is supported adjacent each set on a reed having a resonant frequency matched to the frequency of a particular segment of a spoken syllable or word. In the use of the system, the vibrational amplitudes of the shutters control the amount of each type of radiation that is received by the radiation responsive members. When the difference between the outputs of the radiation responsive members is at a maximum, the system produces an output indicative of the correct enunciation of the word or syllable.

27 Claims, 7 Drawing Figures

INVENTOR

VIRGIL ERBERT

Richards, Harris & Hubbard

ATTORNEY

INVENTOR

VIRGIL ERBERT

Richards, Harris & Hubbard

ATTORNEY

Patented May 16, 1972 3,663,758

3 Sheets-Sheet 3

INVENTOR

VIRGIL ERBERT

Richards, Harris & Hubbard

ATTORNEY

SPEECH PATTERN RECOGNITION SYSTEM

This invention relates to speech pattern recognition systems, and more particularly to systems for detecting the correct enunciation of an entire syllable or word.

The need for a reliable speech pattern recognition system has long been recognized. Such a system would be useful in such diverse fields as language training, speech defect correction, language and dialect analysis, etc. Also, such a system could form the basis of voice-dialed telephone systems, computers and office machines that respond to verbal inputs, locks that open in response to a specific spoken command, etc.

A number of speech pattern recognition systems have been proposed heretofore. One early system included a speech pattern synthesizer comprising a graphic plotter. In a somewhat later system, input spectral patterns were matched with stored patterns. The latter system was subsequently modified to include the initial step of dividing the input patterns into 16 separate patterns which were then matched with corresponding stored patterns. The refined system was capable of 100 percent accuracy in recognizing the digits 0 through 9 when spoken by the same speaker.

More recent speech pattern recognition systems have typically employed computers as comparing mechanisms. In an early computer-equipped system, phonemes, which are defined as the smallest unit of speech that distinguishes one utterance from another, were sorted electronically by means of successive binary decisions. A later system employed a two-step logic sequence. First, input spectral patterns and stored patterns were matched. Second, the results of the first step were compared with statisical data indicating that certain sound elements should follow certain other sound elements. In a still later system, the digits 0 through 9 were successfully detected by comparing the acoustic characteristics of an entire word against stored time-frequency patterns.

From the foregoing, it will be understood that most of the prior speech pattern recognition systems have operated by comparing input speech patterns with stored patterns. Speech recognition systems of this type have several inherent disadvantages. For example, such a system cannot operate in real time, albeit the delay may be slight. This is because the comparison cannot begin until a complete speech pattern is received and cannot end until all of the stored patterns have been compared. Also, the cost of speech pattern recognition systems of the stored pattern comparison type tends to increase drastically as system reliability is increased. Thus, highly reliable systems are often prohibitively expensive.

The present invention comprises the recognition of phonemes in discrete amplitude-frequency-time space. The use of the invention results in a highly reliable speech pattern recognition system that is relatively inexpensive to construct and that operates in real time. In accordance with the broader aspects of the invention, spoken syllables or words are divided into a predetermined number of frequency segments. The amplitude of each segment is compared with the amplitude of a corresponding frequency segment in a stored sound pattern, for a period of time corresponding to the duration of the syllable. If the amplitude of each segment of the spoken syllable or word matches the amplitude of the corresponding segment of the stored pattern a signal indicative of the correct enunciation of the syllable or word is generated.

More specifically, the preferred embodiment of the invention includes radiation modulation members that transmit radiation of different types to radiation receiving members. One radiation type is selectively blocked by a shutter in accordance with the amplitude of a frequency segment. The receiving members drive circuitry that produces an output proportional to the differential intensities of the radiation types.

Preferably, a plurality of sets of radiation modulation members and shutters are provided, each corresponding to a particular frequency segment. In the preferred embodiment, the radiation members of each set have a dimension in the direction of movement of the shutter of the set that corresponds to the amplitude of the corresponding frequency segment. In such a case, the radiation transmitted by the modulation members may be focused relative to the shutter by a cylindrical lens. Alternatively, a strip of modulation members may be combined with a plurality of cylindrical or spherical lenses each corresponding to one of the frequency segments.

A more complete understanding of the invention may be had by referring to the following detailed description when taken in conjunction with the drawings, wherein.

Figure 1:
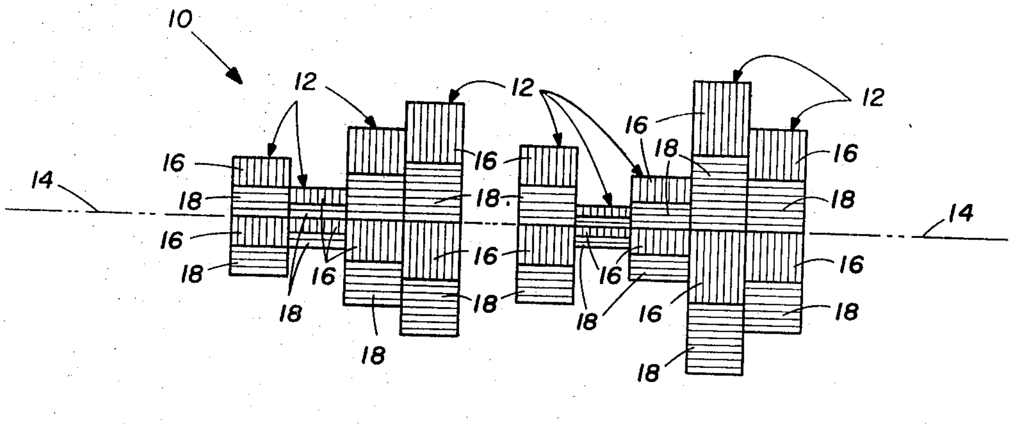
FIG. 1 is an illustration of a stored sound pattern.

Referring now to the drawings, and particularly to FIG. 1, a sound pattern 10 employing the basic concept underlying the invention is shown. In accordance with the practice of the invention, a syllable or short word to be recognized is divided into a plurality of frequency segments and the amplitude of each segment is determined The frequency division step may be accomplished by any of the well known techniques, for example, the audible frequency range (200 to 3,500 Hertz) may be passed through a plurality of band-pass filters. Likewise, the amplitude of each segment may be determined by any suitable manner, such as by means of an oscilloscope. If a multiple syllable word is to be recognized, each syllable of the word is divided into frequency segments and the amplitude of each segment of each syllable is determined.

When the amplitude of each frequency segment of a particular syllable or word has been determined, a sound pattern similar to the pattern 10 shown in FIG. 1 is prepared for the syllable or word. The pattern comprises a plurality of sets of radiation modulation members 12. In a particular sound pattern, each set of radiation modulation members 12 corresponds to a particular one of the frequency segments of the syllable or word represented by the pattern. Furthermore, the vertical dimension of each set 12 corresponds to the amplitude of the frequency segment corresponding to the particular pattern 12. Thus, in the sound pattern 10 shown in FIG. 1, the second and seventh sets 12 correspond to frequency segments having relatively small amplitudes, the fourth and ninth sets correspond to frequency segments having relatively large amplitudes and the fifth set corresponds to a frequency segment having no amplitude.

The sets of modulation members 12 comprises four individual modulation members including two positioned above and two positioned below the center line 14 of the sound pattern 10. The modulation members within a particular set 12 are similar in that they are equal in size and have individual heights comprising one-quarter of the total height of the set. The members within each set differ, however, in that each set includes two modulation members 16 of a first type and two modulation members 18 of a second type.

The characteristic feature of the two types of modulation members 16 and 18 is that they transmit radiations of different types. For example, the members 16 and 18 may be polarizing filters that polarize light in mutually perpendicular directions, color filters of different frequency, etc. The particular types of modulation members 16 and 18 used in the sound pattern 10 is immaterial so long as each type transmits radiation that is distinguishable from the radiation transmitted from the other type.

Figure 2:
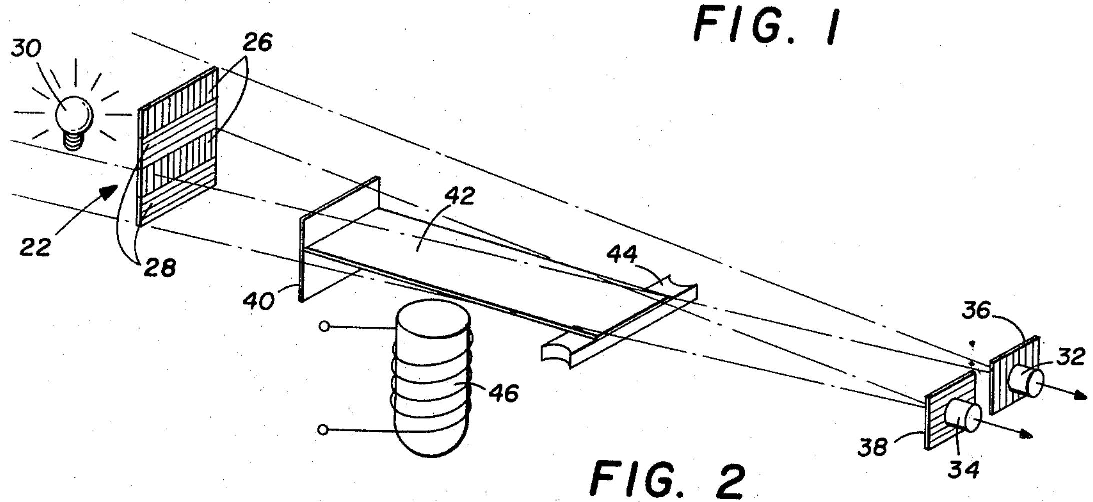
FIG. 2 is a perspective view of a rudimentary speech pattern recognition system employing the invention.

Referring now to FIG. 2, a rudimentary speech pattern recognition system 20 employing the present invention is shown. The system 20 includes a set of modulation members 22 that is similar to the sets 12 of the pattern 10 shown in FIG. 1. The set 22 comprises pairs of equal size individual radiation modulation members 26 and 28. Like the members 16 and 18 of the sets 12, the members 26 and 28 transmit different types of radiation.

The set of radiation modulation members 22 is positioned between a source of radiation 30 and a pair of radiation sensitive elements 32 and 34. The source 30 may comprise a lamp, etc. depending upon the nature of the modulation members 26 and 28 comprising the set 22. The elements 32 and 34 are preferably photoresistors, however, other types of radiation sensitive elements may be used instead of photoresistors, if desired.

A pair of filters 36 and 38 are also positioned between the source 30 and the elements 32 and 34. The filters 36 and 38 are identical in construction to the radiation modulation members 26 and 28, respectively, of the set 22. That is, the filter 36 blocks radiation transmitted by the member 28 and the filter 38 blocks radiation transmitted by the members 26. Thus, the radiation sensitive element 32 is responsive only to radiation transmitted through the members 26 and the radiation sensitive element 34 is responsive only to radiation transmitted through the members 28.

The rudimentary speech pattern recognition system 20 further includes a shutter 40 mounted for movement along a line extending perpendicular to the path of radiation transmitted from the set of radiation modulation members 22 to the radiation sensitive elements 32 and 34. The shutter 40 is mounted on a resonant reed 42 which extends in cantilever fashion from a support member 44 to the shutter 40. The resonant reed 42 is formed from a magnetic material and extends through the field of an electromagnet 46. Normally, the support member 44 and the reed 42 position the upper edge of the shutter 40 in alignment with the center line of the set 22.

In the use of the system 20, a spoken syllable or word is transmitted through a microphone and an amplifier (not shown) to the electromagnet 46. The reed 42 is purposely constructed to resonate at a frequency within the audible range. Therefore, when the spoken syllable is applied to the electromagnet 46, the reed 42 vibrates at its natural frequency. The amplitude of the vibrations of the reed 42 correspond and are in direct proportion to the amplitude of the segment of the spoken syllable having a frequency corresponding to the resonant frequency of the reed.

Assume that a spoken syllable is applied to the electromagnet 46 and that the frequency segment of the syllable corresponding to the resonant frequency of the reed 42 has an amplitude corresponding to the height of the set of radiation modulation members 22 of the system 20. In such a case, the electromagnet 46 causes the reed to vibrate between the position shown in dashed lines in FIG. 3 and the position shown in dotted lines therein. When the shutter 40 is in the dashed line position, it blocks all radiation transmitted by the radiation modulation members 26 and 28 of the set 12 except the radiation transmitted by the uppermost modulation member 26. Because of the filters 36 and 38, the radiation sensitive element 32 responds only to radiation passing through the modulation members 26 and the radiation sensitive element 34 responds only to radiation passing through the modulation member 28. Thus, when the shutter 40 is in the dashed line position shown in FIG. 3, the element 32 produces an output whereas the element 34 produces no output.

Figures 3, 4:
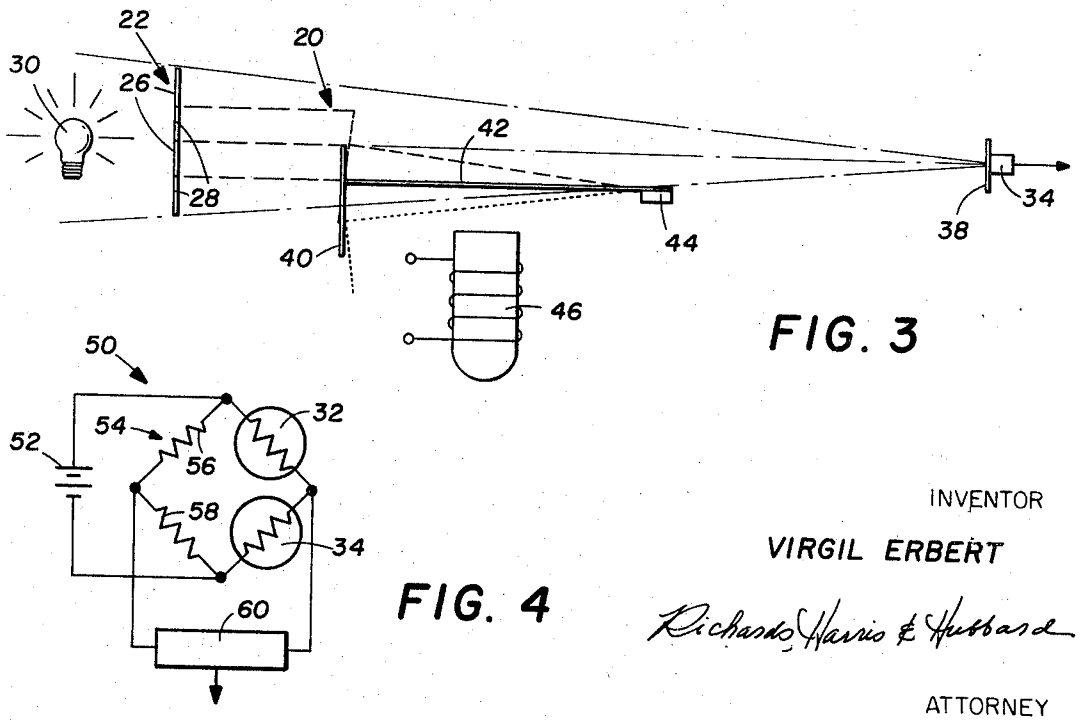
FIG. 3 is a side view of the system shown in FIG. 2.
FIG. 4 is a schematic illustration of an electronic circuit useful in the practice of the invention.

When the shutter 40 is in the dotted line position shown in FIG. 3, it blocks radiation transmitted through the lowermost modulation member 28 of the set 22 but allows radiation transmitted through the three uppermost radiation modulation members of the set 22 to pass. Thus, the radiation sensitive element 32 receives radiation transmitted through two of the modulation members of the set 22 whereas the element 32 receives radiation transmitted through only one of the modulation members. The element 32, therefore, produces an output signal that is twice as great as the output signal produced by the element 34.

Referring now to FIG. 4, a circuit 50 useful in the operation of the system 20 is shown. The circuit 50 includes a source of electric potential 52 that is connected between two terminals of a bridge 54. The bridge 54 includes the radiation sensitive elements 32 and 34 and further includes a pair of fixed resistors 56 and 58. A threshold device 60, such as a relay or a switching transistor, is connected across the remaining two terminals of a bridge 54 and is adjusted to produce an output signal whenever the difference between the radiation received by the radiation sensitive element 32 and the radiation received by the radiation sensitive element 34 exceeds a predetermined amount.

The circuit 50 is so constructed that when the reed 52 of the system 22 is vibrating the shutter 40 between the dashed line and the dotted line positions shown in FIG. 3, the threshold device 60 produces an output signal. That is, when the shutter 40 is in the dashed line position, radiation sensitive element 32 produces an output while the radiation sensitive element 34 produces no output. In this condition, the circuit 50 actuates the threshold device 60 to produce an output signal. Likewise, when the shutter 40 is in the dotted line position shown in FIG. 3, the radiation sensitive element 34 produces twice as much output as the radiation sensitive element 34. Insofar as the input to the threshold device 60 is concerned, this condition is identical to the condition produced when the shutter 40 is in the dashed line position. Thus, the threshold device 60 is triggered in both cases.

Assume now that the amplitude of the frequency segment of the spoken syllable received by the magnet 46 corresponding to the resonant frequency of the reed 42 is somewhat less than the amplitude represented by the height of the set of radiation modulation members 22. In such a case, the electromagnet 46 actuates the reed 42 to vibrate the shutter 40 between positions slightly below the dashed line position shown in FIG. 3 and slightly above the dotted line position shown therein. In such a case, when the shutter 40 is in its uppermost position it passes all of the radiation transmitted through the uppermost radiation modulation member 26 and a portion of the radiation transmitted by the uppermost radiation modulation member 28. Similarly, when the shutter 40 is in its lowermost position it passes all of the radiation transmitted through the uppermost modulation member 26, all of the radiation transmitted through the uppermost modulation member 28 and a portion of the radiation transmitted through the lowermost modulation member 26.

In the first case, the output produced by the radiation sensitive element 32 is the same as when the shutter 40 is in the dashed line position but the element 34 produces some, rather than no, output. In the second case, the output of the radiation sensitive element 34 is the same as when the shutter 40 is in the dotted line position but the output produced by the element 32 is less. On both cases, the difference between the outputs of the elements 32 and 34 is not as great as when the shutter vibrates between the dashed line and dotted line positions shown in FIG. 3. Therefore, by properly adjusting the bridge 54, the circuit 50 can be made to produce no output signal when the vibrational amplitude of the shutter 40 is less than a predetermined magnitude. Of course, the sensitivity of the circuit 50 can be rendered adjustable, if desired.

Assume now that the amplitude of the frequency segment of the spoken syllable corresponding to the resonant frequency of the reed 42 is greater than the amplitude represented by the height of the set of radiation modulation members 22. In such a case, the shutter 40 is vibrated between a position slightly above the position shown in dashed lines in FIG. 3 and a position slightly below the position shown in the dotted lines therein. In the first case, the shutter 40 blocks a portion of the radiation transmitted through the uppermost radiation modulation member 26. At the same time, the shutter 40 passes a portion of the radiation transmitted by the lowermost radiation modulation member 28. In the second case, the shutter 40 passes all of the radiation transmitted through the two modulation members 26 of the set 22, all of the radiation transmitted to the uppermost modulation member 28 and a portion of the radiation transmitted through the lowermost modulation member 28. In both instances, the difference between the outputs generated by the radiation sensitive element 32 and 34 is less than is the case when the vibrational amplitude of the shutter 40 matches the height of the set 22. Thus, the same adjustment to the bridge 54 that rendered the circuit 50 insensitive to vibrations having less than a predetermined amplitude also renders the circuit insensitive to vibrations having an amplitude greater than a predetermined amplitude.

Figure 5:
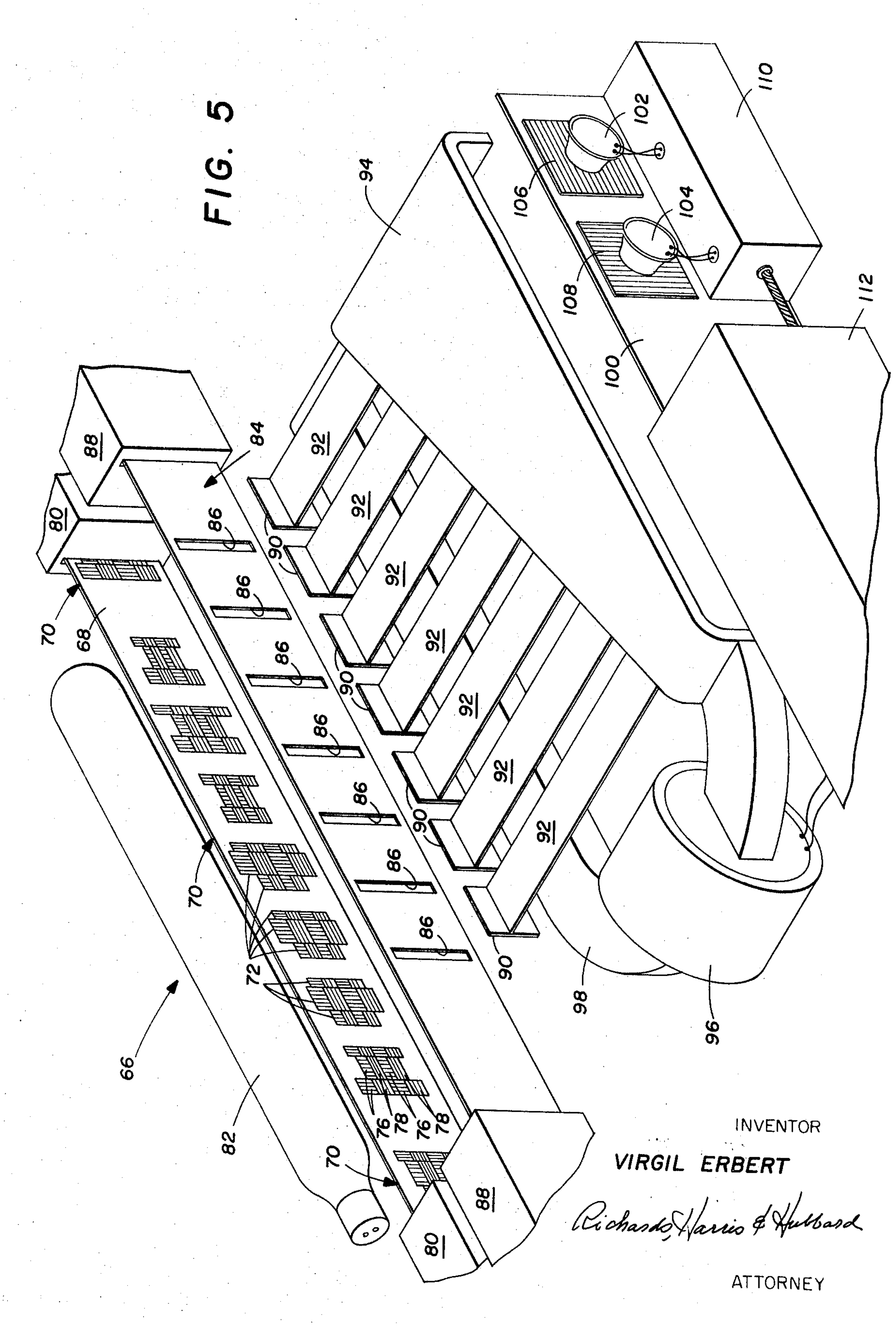
FIG. 5 is a perspective view of the preferred embodiment of the invention.

Referring now to FIG. 5, a speech pattern recognition system 66 comprising the preferred embodiment of the invention is shown. The system 66 includes a tape 68 having a plurality of sound patterns 70 formed in it. Each pattern 70 of the system 66 is similar to the sound pattern 10 shown in FIG. 1 in that it includes a plurality of sets of modulation members 72 each including two types of modulation members 76 and 78. The stored pattern 70 differs from the pattern 10 in that each frequency segment of each pattern 70 of the tape 68 includes a plurality of sets of modulation members 72.

The tape 68 of the system 66 extends between a pair of tape positioning mechanisms 80. The mechanisms 80 are conventional in design and are selectively operated to position a desired one of the stored sound patterns 70 in the tape 68 in alignment with a lamp 82. In use, the lamp 82 directs light through the modulation members 76 and 78 of the sets of the modulation members 72 comprising the stored speech pattern 70. The members 76 and 78 in turn transmit distinct types of radiation through the remainder of the system 66.

A mask 84 is positioned adjacent the type 68 on the side opposite the lamp 82. The mask 84 is opaque to radiation transmitted by the modulation members 76 and 78 and has a plurality of slots 86 formed through it. The slots 86 are positioned in alignment with the various frequency segments comprising the stored sound patterns 70 in the tape 68.

The mask 84 extends between a pair of mask positioning mechanisms 88. The mechanisms 88 are conventional in design and operate to move the mask 82 relative to the tape 68. That is, whenever a selected stored pattern 70 has been positioned in alignment with the lamp 82 by the tape positioning mechanisms 80, the mask positioning mechanisms 88 move the mask 84 relative the tape 68 and thereby sequentially expose the several sets of modulation members 72 comprising each frequency segment of the stored pattern 70. By this means, the speech pattern recognition system 66 shown in FIG. 5 recognizes words including several syllables. It should be noted that the various sets of modulation members 72 formed in the tape 68 have different widths. This is necessary because the various syllables, i.e., combinations of phonemes, of a word including several syllables typically are of different durations of time.

The speech pattern detection system 66 further includes a plurality of shutters 90. Each shutter 90 is constructed and positioned similarly to the shutter 40 of the system 20 and is mounted on a resonant reed 92. The reed 92 extends from an inverted U-shaped structure 94 and are actuated by an electromagnet 96. The magnet 96 is mounted on a horseshoe shaped core 98 which extends from the structure 94 through the magnet 96 and under the reeds 92.

A screen 100 is positioned adjacent the structure 94 on the side opposite the reeds 92. The screen supports a pair of light sensitive members 102 and 104 and has a pair of filters 106 and 108 mounted in it. The filters 106 and 108 are formed identically to the modulation members 76 and 78 of the stored sound patterns 70 in the tape 68 and, accordingly, the members 102 and 104 respond solely to radiation transmitted by the members 76 and 78, respectively. The members 102 and 104 receive radiation transmitted by the modulation members comprising the sets of 72 of the stored sound pattern 70 and are connected to circuitry contained in the housing 110 which is similar to the circuit 50 shown in FIG. 4 in that it produces an output whenever the output of the member 102 exceeds the output of the member 104 by a predetermined amount.

The circuitry within the housing 110 differs slightly from the circuit 50 in two respects. First, the circuit is so adjusted that all of the shutters 90 must be vibrating at an amplitude corresponding to the height of their respective sets of modulation members 72 in order for the circuitry to produce an output signal. Second, the circuit may be equipped with a timing circuit, such as a charging capacitor driven by the threshold member and a second threshold member that is actuated whenever the capacitor becomes fully charged. In such a case the circuitry must produce an output signal during an entire word in order for successful output signal to be generated.

The circuitry within the housing 110 is connected to circuitry within a housing 112. The housing 112 includes an amplifier circuit that receives a spoken syllable and that drives the electromagnet 96. The housing 112 further includes circuitry that controls in the operation of both the tape positioning mechanisms 80 and the mask positioning mechanisms 88. Finally, the housing 112 may include a circuit responsive to the output of the circuitry within the housing 110 for generating a suitable reward signal whenever a word has been correctly enunciated.

The system 66 is capable of a wide variety of uses. One particularly important use comprises a teaching machine. In such a case, a teacher operates the positioning mechanism 80 to position a stored pattern 70 corresponding to a particular word in alignment with the lamp 82. Thereafter, the teacher visually instructs a student to pronounce the word, such as by holding up a card having a word printed on it, or by writing the word on the blackboard. Thereafter, the student speaks the word, into a microphone or the like. As a student speaks the word, the signal received by the microphone is amplified and fed to the electromagnet 96. This causes the resonant reeds 92 to vibrate at their resonant frequency and at the amplitudes corresponding to the amplitude of the corresponding frequency segments of the spoken word. At the same time, the mask moves relative to the tape 68 so that each syllable of the word is sequentially exposed. By this means, the student is constrained to correctly enunciate each syllable of the word at the proper time. Otherwise, the system 66 will not produce an output indicating the correct enunciation of the word.

At any given instant, the system 66 operates similarly to the system 20 shown in FIG. 2 and 3. That is, radiation transmitted by the modulation members 76 and 78 comprising the sets 72 of the stored sound pattern 70 is either passed to the light sensitive members 102 and 104 or is blocked depending upon the amplitude of the vibrations of the reeds. Within the system 66, each reed 92 operates similarly to the reed 42 of the system 20 to vibrate its respective shutter between positions corresponding to the dashed line and dotted line positions shown in FIG. 3 whenever the amplitude of its particular frequency segment in a spoken word corresponds to the height of its respective set of modulation members 72. On the other hand, if the amplitude of its particular frequency segment does not correspond to the height of its respective set of modulation members, the reed vibrates its shutter between positions that do not correspond with the dashed line and dotted line positions shown in FIG. 3. In this manner, the differential between the output of the light sensitive member 102 and the output of the light sensitive member 104 is maximized whenever all of the reeds 92 have vibrational amplitudes corresponding to the height of their respective sets of modulation members 72.

When the system 66 is employed as a teaching machine, the housing 112 preferably includes circuitry that produces a reward output whenever a correct enunciation occurs. For example, the circuit within the housing 112 can be arranged to cause the mechanisms 80 to advance the tape 68 to position the next stored sound pattern 70 in alignment with the lamp 82 whenever the word corresponding to a particular sound pattern has been correctly pronounced. The same circuit can be used to retain the tape 68 in the same position and to reinitiate the operation of the mask 84 whenever the word corresponding to the particular sound pattern has been mispronounced. Of course, other arrangements can be provided to suit particular needs.

Figure 6:
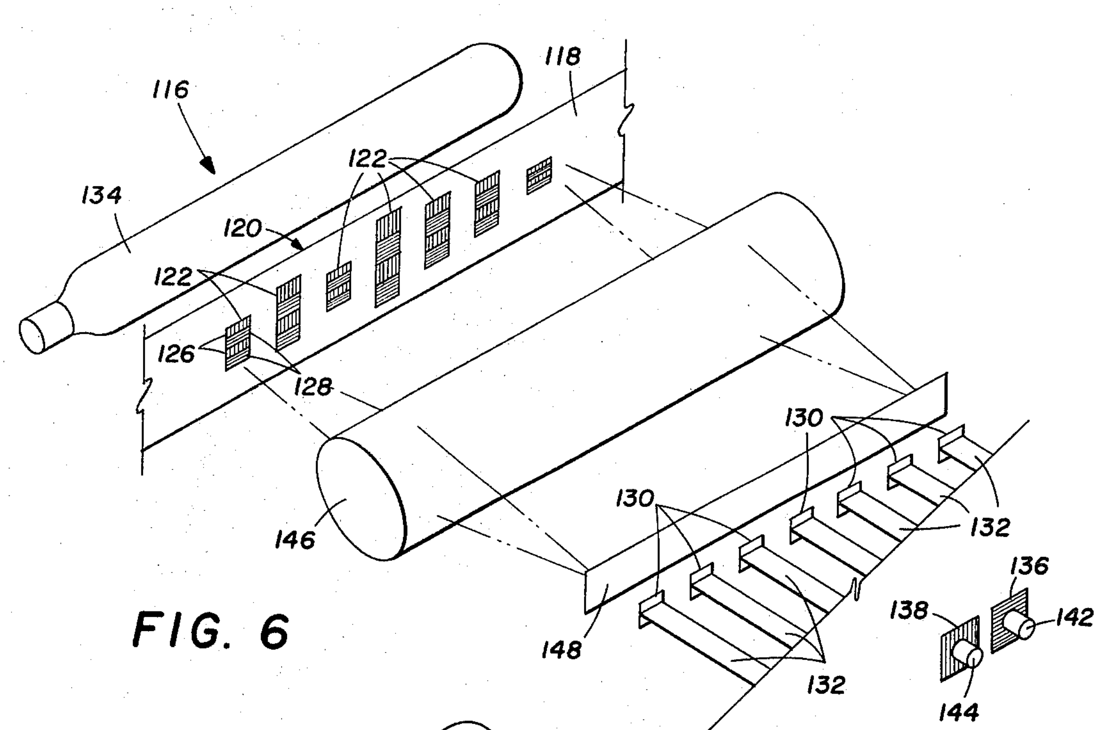
FIG. 6 is a perspective view of a modification of the preferred embodiment.

Referring now to FIG. 6, a speech pattern recognition system 116 comprising a modification of the system 66 shown in FIG. 5 is illustrated. The system 116 is similar to the system 66 in that it includes a tape 118 having a plurality of stored sound patterns 120 formed in it. Each pattern 120 is comprised of a plurality of sets of modulation members 122 each including a plurality of individual modulation members 126 and 128.

The system 116 further includes a plurality of shutters 130 each supported on a resonant reed 132. The reeds 132 are preferably supported on and actuated by a structure similar to the members 94, 96 and 98 illustrated in FIG. 5.

In addition to the tape 118, the shutters 130 and the reeds 132, the system 116 includes a lamp 134 which transmits light to the modulation member 126 and 128 comprising the sets 122 and a pair of filters 136 and 138 which are constructed identically to the modulation member 126 and 128. A pair of light sensitive members 142 and 144 are positioned behind the filters 136 and 138 respectively, and are therefore actuated by light transmitted by the modulation members 126 and 128, respectively.

The system 116 differs in the system 66 in two major respects. First, the system 116 includes a cylindrical lens 146 which receives radiation transmitted by the modulation members 126 and 128 and which focuses the radiation on a focal plane 148. When the cylindrical lens 146 is employed, the height of the sets 122 comprising the stored sound pattern 120 can be relatively large to facilitate the manufacture of the modulation members 126 and 128 while the corresponding vibrational amplitudes of the reeds 132 remain relatively small. This reduces the amount of amplification that must be supplied to the driving electromagnet for the reeds in order to produce the required amount of vibrational amplitude.

The system 116 also differs from the system 66 in that each frequency segment of the stored pattern 120 includes a single set of modulation members 122. For this reason, the system 116 is limited to the recognition of single syllables or short words. It should be understood, however, that the tape 118 can be constructed similarly to the tape 68 of the system 66 and that the system 116 can be provided with a mask similar to the mask 84, if desired.

Figure 7:
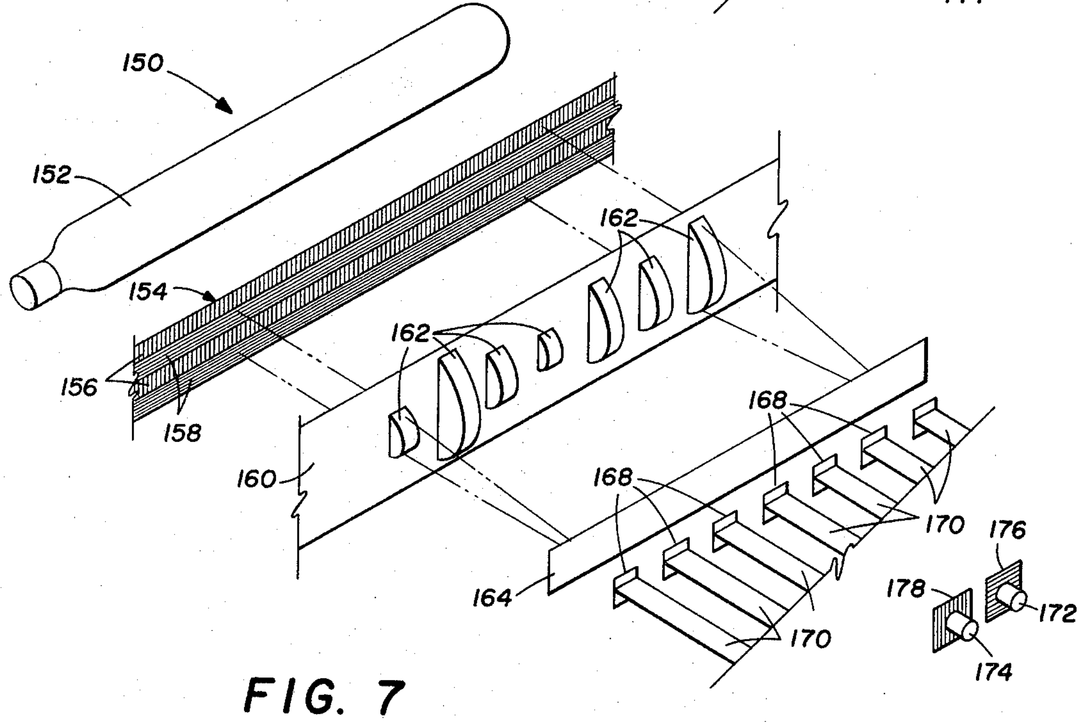
FIG. 7 is a perspective view of an alternative embodiment of the invention.

Referring now to FIG. 7, a second embodiment of the invention is shown. The second embodiment comprises a speech pattern recognition system 150 including the lamp 152 that directs light through a belt 154 including alternate strips of radiation modulation material 156 and 158. Radiation transmitted by the strips 156 and 158 is directed through a belt 160 including a plurality of individual cylindrical lenses 162. The lenses focus the transmitted radiation onto a focal plane 164.

The system 150 further includes a plurality of shutters 168 which are supported on individual resonant reeds 170. Preferably, the reeds are supported and operated by a structure similar to the members 94, 96, 98 shown in FIG. 5. Finally, the system 150 includes a pair of light sensitive devices 172 and 174 and a pair of filters 176 and 178 which are preferably constructed identically to the strips 156 and 158 of the belt 154.

The sole difference between the system 150 and the system 116 is that the amplitude of the various portions of the stored sound pattern are not defined by the heights of sets of modulation members, but are instead defined by the characteristics of the various lenses 162. That is, the belt 154 transmits the radiation of uniform height. The images of the transmitted radiation that are focused on the focal plane, however, are of different heights depending upon the characteristics of the various lenses 162. The output on the system depends upon the amplitude of the vibrations of the shutters 168 relative to the height of the images of the transmitted radiation and, accordingly, the system operates identically to the system 116.

It should be understood that sets of lenses 162 may be mounted on the belt 160. In such a case, the system 150 is preferably provided with mechanisms that position the various sets of lenses in alignment with the belt 154 and the focal plane 164. It should also be understood that the lenses 162 may be grouped similarly to the grouping of the sets 172 in the stored sound patterns 70 in the system 66 and that a suitable mask may be provided so that the system 150 can recognize words including several syllables. It should be further understood that spherical lenses can be used in the system 150 instead of cylindrical lenses, if desired.

Speech pattern recognition systems employing the present invention inherently include several advantages over prior systems. For example, systems of the type shown in the drawings operate in real time. That is a syllable or word is compared as it is spoken, rather than afterward. Also, systems employing the present invention can be constructed from a small number of easily manufactured parts. Thus, such systems are inexpensive to fabricate and maintain.

Although specific embodiments of the invention are illustrated in the drawings and described herein, it will be understood that the invention is not limited to the embodiments disclosed, but is capable of rearrangement, modification and substitution of parts and elements without departing from the spirit of the invention.

What is claimed is:

1. A speech pattern recognition system comprising:
means for directing two distinct types of radiation along a predetermined course;
a shutter mounted for movement along a path extending between a point wherein the shutter is positioned out of the course and a point wherein the shutter blocks at least a portion of the course;
means for at least momentarily positioning the shutter at a point on the path corresponding to the amplitude of a particular frequency segment of a spoken syllable and thereby blocking at least a portion of at least one radiation type, and
means positioned on the course beyond the shutter and responsive to the intensity of both radiation types for producing an amplitude indicative output when the difference between the intensity of one radiation type and the intensity of the other radiation type exceeds a predetermined level.

2. The speech pattern recognition system according to claim 1 wherein the positioning means comprises means for vibrating the shutter along the path at the frequency of and at an amplitude corresponding to that of the particular frequency segment.

3. The speech pattern recognition system according to claim 1 wherein the positioning means includes a shutter supporting reed having a resonant frequency equal to the frequency of the particular frequency segment.

4. The speech pattern recognition system according to claim 1 wherein the positioning means vibrates the shutter to a position on the path wherein it blocks all of the radiation of one type whenever the amplitude of the particular frequency segment is equal to a predetermined magnitude.

5. A speech pattern recognition system comprising:
means for directing two types of radiation along a plurality of paths each corresponding to a particular frequency segment in a spoken syllable;
a plurality of shutters each mounted for movement into and out of one of the paths;
means for moving each shutter into its respective path a distance corresponding to the amplitude of its respective frequency segment and thereby at least partially blocking at least one radiation type, and
means for receiving radiation of both types directed along all of the paths and for producing an output when the differential between the intensity of the received radiation of one type and the intensity of the received radiation of the other type exceeds a predetermined magnitude.

6. The speech pattern recognition system according to claim 5 wherein the shutter moving means comprises a plurality of shutter vibrating members each for moving one of the shutters and each having a resonant frequency equal to the frequency of a particular one of the frequency segments.

7. The speech pattern recognition system according to claim 6 wherein the shutter moving means further includes a single electromagnet for actuating all of the shutter vibrating members.

8. The speech pattern recognition system according to claim 5 wherein the radiation directing means comprises:

a belt including strips comprising different types of radiation modulation members, and a plurality of cylindrical lenses each individual to one of the shutters.

9. A speech pattern recognition system comprising:

a plurality of sets of radiation modulation members each corresponding to a portion of the audible frequency range and each including two types of modulation members;

means for simultaneously directing radiation through all of the sets of modulation members;

means for receiving radiation directed through all of the sets of modulation members and for producing an output indicative of the difference between the intensity of the radiation that has been modulated by the modulation members of one type and the intensity of the radiation that has been modulated by the modulation members of the other type;

a plurality of shutters each for selectively preventing at least part of the radiation that has been modulated by at least one modulation member of one of the sets from reaching the radiation receiving means, and means for vibrating each shutter at a frequency of and at an amplitude corresponding to the frequency and amplitude of its corresponding portion of the audible frequency range.

10. The speech pattern recognition system according to claim 9 further including a cylindrical lens mounted between the sets of radiation modulation members and the shutters for focusing the radiation directed through the modulation members.

11. The speech pattern recognition system according to claim 9 wherein the plurality of sets of radiation of modulation members is mounted on a belt, wherein the belt is mounted for movement relative to the radiation directing means, and further including at least one additional plurality of sets of radiation modulation members mounted on the belt.

12. The speech pattern recognition system according to claim 9 wherein each of the sets of radiation modulation members has a dimension in the direction of vibration of the shutters corresponding to the amplitude of its respective portion of the audible frequency range in a particular syllable.

13. The speech pattern recognition system according to claim 9 further including means for controlling the period of time that radiation is directed through the sets of modulation members as a function of the duration of a speech segment corresponding to the plurality of sets of modulation members.

14. A speech pattern recognition system comprising:

at least two radiation modulation members, one for transmitting radiation of one type and the other for transmitting radiation of another type;

a shutter mounted for movement along a path extending between a first point wherein the shutter passes radiation transmitted by both of the modulation members and a second point wherein the shutter blocks radiation transmitted by at least one of the members;

means for at least momentarily positioning the shutter at a point on the path corresponding to the amplitude of a particular frequency segment of a spoken syllable, and means responsive to the differential magnitude of radiation received from the modulation members for producing an amplitude indicative output.

15. The speech pattern recognition system according to claim 14 wherein the radiation modulation members have a dimension in the direction of the path of movement of the shutter that corresponds to the amplitude of the particular frequency segment of the spoken syllable.

16. The speech pattern recognition system according to claim 14 wherein the radiation modulation members comprise a portion of a set of radiation modulation members comprising four members, two for transmitting radiation of one type and two for transmitting radiation of another type.

17. The speech pattern recognition system according to claim 16 wherein the modulation members are alternately arranged, wherein the shutter normally blocks two of the modulation members and wherein the shutter positioning means vibrates the shutter about its normal position.

18. The speech pattern recognition system according to claim 14 wherein the radiation modulation members comprise polarizing filters, one for polarizing radiation in one direction and the other for polarizing radiation in the other direction.

19. The speech pattern recognition system according to claim 14 wherein the radiation modulation members comprise color filters, one for transmitting radiation of one color and the other for transmitting radiation of a different color.

20. A speech pattern recognition system comprising:

a plurality of groups of radiation modulation members, each of said groups being individual to a particular utterance of speech and each radiation modulation member within each group corresponding to a particular frequency segment of its particular utterance;

a source of radiation;

belt means for supporting the groups of radiation modulation members and for positioning a selected group in the path of radiation from the source;

means for receiving radiation passing from the source of radiation through all of the radiation modulation members of the selected group and for producing an output indicative of the intensity of the radiation received;

a plurality of shutters each individual to one of the radiation modulation members of the selected group, each of said shutters for selectively preventing radiation directed through its respective radiation modulation member from reaching the radiation receiving means; and means for vibrating each shutter at a frequency corresponding to the frequency segment represented by its corresponding radiation modulation member and at an amplitude corresponding to the amplitude of the same frequency segment of a spoken utterance.

21. The speech pattern recognition system according to claim 20 wherein each radiation modulation member has a dimension corresponding to the amplitude of its particular frequency segment of its particular utterance and wherein the shutter vibrating means vibrates each shutter in the direction of said dimension of its corresponding radiation modulation member.

22. The speech pattern recognition system according to claim 21 further including a second radiation modulation member supported on the belt means adjacent each radiation modulation member thereon, wherein the radiation modulation members and the second radiation modulation members pass distinct types of radiation to the radiation receiving means, and wherein the radiation receiving means produces an output indicative of the difference between the intensity of the received radiation of one type and the intensity of the received radiation of the other type.

23. The speech pattern recognition system according to claim 22 wherein the shutter vibrating means vibrates each shutter to block radiation from its respective radiation modulation member and to pass radiation from the associated second radiation modulation member in response to an amplitude of its particular frequency segment of a spoken utterance which is equal to the amplitude of its corresponding modulation member.

24. A speech pattern recognition system comprising:

a plurality of groups of radiation modulation members each including a plurality of series of modulation members all corresponding to a particular frequency segment;

each of said modulation members having a height corresponding to the amplitude of the respective frequency segment of a particular utterance and having a width corresponding to the duration of the particular utterance;

means for directing radiation through all of the modulation members of a particular group;

means for receiving radiation directed through the modulation members and for producing an output indicative of the intensity of the radiation received;

a mask positioned between the modulation members and the radiation receiving means for permitting radiation directed through a selected modulation member of each series to pass to the radiation receiving means;

a plurality of shutters each for controlling the passage of radiation directed through the selected modulation members to the radiation receiving means; and means for vibrating each shutter at a frequency corresponding to the frequency segment represented by its corresponding series of modulation members and at an amplitude corresponding to the amplitude of the same frequency segment of a spoken utterance.

25. The speech pattern recognition system according to claim 24 wherein the radiation directing means is further characterized by a source of radiation and belt means for supporting the groups of radiation modulation members and for positioning a particular group in alignment with the source of radiation.

26. The speech pattern recognition system according to claim 25 wherein the shutter vibrating means comprises a plurality of reeds each supporting one of the shutters and each having a natural frequency corresponding to the frequency segment represented by the series of modulation members corresponding to its shutter.

27. The speech pattern recognition system according to claim 26 further including a second radiation modulation member associated with each radiation modulation member, wherein the radiation modulation members and the second radiation modulation member pass different types of radiation to the radiation receiving means, wherein the radiation receiving means produces an output whenever the differential between the intensity of the radiation received from the radiation modulation members and the intensity of the radiation received from the second radiation modulation members exceeds a predetermined level, and wherein the shutters function to control such differential intensity in accordance with the amplitudes of the various frequency segments comprising the spoken utterance.

* * * * *